United States Patent [19]
Bontemps et al.

[11] Patent Number: 5,923,663
[45] Date of Patent: Jul. 13, 1999

[54] METHOD AND APPARATUS FOR AUTOMATICALLY DETECTING MEDIA CONNECTED TO A NETWORK PORT

[75] Inventors: Evan J. Bontemps; Louis R. Gagliardi, both of Harris County, Tex.

[73] Assignee: Compaq Computer Corporation

[21] Appl. No.: 08/823,512

[22] Filed: Mar. 24, 1997

[51] Int. Cl.$^6$ .................................................. H04L 12/413
[52] U.S. Cl. ........................... 370/445; 370/450; 375/377
[58] Field of Search ...................... 370/378, 379, 370/381, 382, 383, 280, 244, 248, 300, 301, 362, 465, 902, 905, 474, 476, 276, 282, 285, 293, 296, 400, 401, 402, 407, 408, 434, 445, 446, 450; 378/377

[56] References Cited

U.S. PATENT DOCUMENTS

| | | |
|---|---|---|
| 5,541,957 | 7/1996 | Lau . |
| 5,555,261 | 9/1996 | Nakayama et al. ...................... 370/474 |
| 5,568,525 | 10/1996 | de Nijs et al. . |
| 5,574,722 | 11/1996 | Slykhouse et al. . |
| 5,577,023 | 11/1996 | Marum et al. ........................... 370/445 |
| 5,617,418 | 4/1997 | Shirani et al. . |
| 5,754,552 | 5/1998 | Allmond et al. ........................ 370/465 |

Primary Examiner—Chi H. Pham
Assistant Examiner—Steven Nguyen
Attorney, Agent, or Firm—Akin, Gump, Strauss, Hauer & Feld, LLP

[57] ABSTRACT

A media detection system that detects an external device coupled to a port of a network device and that establishes a working communication link. The media detection system includes a port connector including first and second contact sets and a physical layer device which includes a transmit output and a receive input. The physical layer device monitors its receive input for communication signals and provides a link detect signal indicative thereof. The media detection system further includes a select circuit that selectively couples the transmit output and the receive input of the physical layer device to the first and second contact sets, respectively, of the port connector in a first state and crosses the connection in a second state. A control circuit is provided that toggles the select circuit between the first and second states until the link detect signal indicates reception of communication signals, whereupon the control circuit holds the select circuit in the particular state in which communication signals were detected. If the link signal is negated thereby indicating subsequent loss of the communication signals, the control circuit preferably returns to the toggle mode to detect a new device coupled to the port.

16 Claims, 4 Drawing Sheets

METHOD AND APPARATUS FOR AUTOMATICALLY DETECTING MEDIA CONNECTED TO A NETWORK PORT

FIELD OF THE INVENTION

The present invention relates generally to the field of networking devices, and more particularly to a system and method for automatically detecting media connected to a network port and for establishing a working communication link.

DESCRIPTION OF THE RELATED ART

There are many different types of networks and network systems for sharing files and resources or for otherwise enabling communication between two or more computers. The term "network device" generally refers to a computer linked to a network via a network interface card (NIC), or to other devices that perform specialized functions in the network, such as repeaters or hubs, bridges, switches, routers and brouters, to name a few examples. Networks may be categorized based on various features and functions, such as message capacity, range over which nodes are distributed, node or computer types, node relationships, topology or logical and/or physical layout, architecture or structure based on cable type and data packet format, access possibilities, etc. For example, the range of a network refers to the distance over which nodes are distributed, such as local-area networks (LANs) within an office or floor of a building, wide-area networks (WANs) spanning across a college campus, or a city or a state and global-area networks (GANs) spanning across national boundaries.

A network may be expanded by using one or more repeaters, bridges, switches or similar type devices. A repeater is a device that moves all packets from one network segment to another by regenerating, re-timing, and amplifying the electrical signals. A bridge is a device that operates at the Data-Link Layer of the OSI (Open Systems Interconnection) Reference Model and passes packets from one network to another and increases efficiency by filtering packets to reduce the amount of unnecessary packet propagation on each network segment. A switch is a network device similar in function to a multiport bridge, but includes a plurality of ports for coupling to several similar networks for directing network traffic among the networks. A repeater or a switch may also include a second set of ports for coupling to higher speed network devices, such as one or more uplink ports.

Network architectures based on Ethernet or Token Ring encompass the Data-Link and Physical Layers and represent the most common protocols used. The Data Link layer is responsible for constructing and transmitting data packets as well as receiving and deconstructing data packets. The Data-Link layer provides services for the various protocols at a Network Layer and above it uses the Physical Layer below it to transmit and receive the data packets. The Physical Layer receives data packets from the Data-Link Layer above it and converts the contents of these packets into a series of electrical signals that represent logic zero (0) and one logic (1) values in a digital transmission. These signals are sent across a transmission medium to the Physical Layer of a network device at the receiving end. At the destination, the Physical Layer converts the electrical signals into a series of bit values, which are grouped into packets and passed up to the Data-Link Layer of the destination device by the Physical Layer of the destination network device.

Many different structures and protocols are known for implementing the Data Link and Physical Layers. For example, Ethernet operates at 10 megabits per second (Mbps) (e.g. 10Base-T, 10Base-F) while fast Ethernet (e.g. 100Base-T, 100Base-FX) operates at 100 Mbps. Standard Token Ring topologies generally operate between 4 and 16 Mbps. Another standard is the ATM (Asynchronous Transfer Mode), which operates at speeds of 25.6 Mbps (ATM25 UTP) or 155 Mbps (ATM155 UTP5), although other versions may operate at even higher data rates.

The particular structure and protocol is typically designed to operate with the particular media through which communication takes place. Several Ethernet standards are defined for twisted-pair cables. Ethernet 10Base-T is a copper-based protocol that operates over two pairs of twisted-pair telephone wire. Ethernet 100Base-TX operates over two pairs of Category 5 unshielded twisted-pair (UTP) or shielded twisted-pair (STP) wire. Ethernet 100Base-T4 operates over four pairs of Category 3, 4 or 5 UTP wire. The ATM25 UTP architecture uses two pair of UTP wire and ATM155 UTP5 uses two pair of Category 5 UTP wire. An Ethernet standard is defined for coaxial cable, and Ethernet, Token Ring and ATM standards are defined for fiber-optic cables. For example, Ethernet 100Base-FX operates over two optical fibers. Token Ring architectures are defined for both UTP wire (Token Ring UTP) and STP wire (Token Ring STP). FDDI (Fiber Distributed Data Interface) operates using multi-mode or single-mode fiber-optic cables. CDDI or CuDDI (Copper Distributed Data Interface) is a network architecture that implements the FDDI specifications using electrical signals over conductive wire, such as copper wire, rather than on optical cable. The CuDDI UTP5 protocol, for example, operates over Category 5 UTP wire.

Most of the protocols described above (10Base-T, 100Base-TX, Token Ring UTP/STP, CuDDI UTP5, ATM155 UTP5, ATM25 UTP) use two pairs of signals for communication, including a transmit (TX) pair and a receive (RX) pair of signals. Each pair includes a positive and negative counterpart, although the Token Ring signals are Differential Manchester Encoded and thus are not polarity sensitive. The ATM155 UTP and all of the Ethernet standards are polarity sensitive, whereas the ATM25 standard is polarity insensitive. Also, the 100Base-T4 protocol uses two additional bidirectional signal pairs. Some configurations, however, use a single channel for each of the transmit and receive functions. Also, wireless communication networks are known which communicate without physical media cables.

A network device typically includes a Physical Layer entity (PHY) for containing the functions that transmit, receive and manage the encoded signals that are impressed on and recovered from a physical medium through a medium dependent interface (MDI). The MDI is the mechanical and electrical interface between the transmission medium and the medium attachment unit or PHY. To complete a communication link, a crossover function is performed in which the transmit signals of one device is coupled to the receive signals of another device. For the 100Base-T4 protocol, bidirectional signals are also included which must be crossed as well. The crossover function may be performed within either network device or by a crossover cable connected in between. Standards according to the IEEE (Institute of Electrical and Electronics Engineers, Inc.) recommend a PHY with an internal crossover within the ports of a repeater or hub. An MDI implementing an internal crossover is typically marked with a graphic "X" symbol denoting the crossover function. The IEEE Standards also recommend a PHY without the internal crossover for Data Terminal Equipment (DTE), which is any source or destination of data connected to a LAN. In this manner, a compatible DTE device may be connected to a port of a repeater using a straight-through cable. For example, a computer system with an appropriate NIC is considered a DTE device, which usually does not incorporate the crossover function so that a straight-through cable is required for connection to a repeater or hub.

It is often desired to expand the network further by coupling two repeaters, bridges, switches, etc. together. If each port of both network devices includes an internal crossover function, then a crossover cable is required to complete the link between them. A crossover cable is also required if neither port includes an internal crossover function. A straight-through cable is required if one port includes the crossover function and the other does not. If multiple DTE devices, computer systems, repeaters and switches must be interconnected, the appropriate cables must be used for each connection. To reduce confusion and provide flexibility, some network devices include at least one dual uplink port with two separate connectors or plugs, one connector that implements the crossover function and one that does not. Alternatively, the uplink port may include a mechanical switch to switch between a straight-through or crossover connection, where the switch is manually toggled depending upon the configuration of the network devices and the available cable.

Dual ports and manually switched ports provide some flexibility, but neither is an optimal solution. If either port and/or the cable is not appropriately marked (such as with or without the graphic symbol "X", the user must guess at the appropriate connection. Often, the user guesses, but then arrives at the desired connection only after trial and error. Also, mechanical switches typically fail over time, especially for network systems that are continually being re-configured or modified. Further, dual ports and mechanical switches are bulky and consume valuable space on the network device. It is desired to provide a solution to achieve the appropriate communication link automatically, regardless of cable type.

SUMMARY OF THE INVENTION

A media detection system according to the present invention detects an external device coupled to a port of a network device and establishes a working communication link. The media detection system includes a port connector implementing an MDI including first and second contact sets and a physical layer device that includes a transmit output and a receive input. The physical layer device monitors its receive input for transmitted communication signals and provides a link detect signal indicative thereof. The media detection system further includes a select circuit that selectively couples the receive input of the physical layer device to the first and second contact sets of the port connector in first and second states, respectively. The transmit output is preferably connected to the opposite contact set relative to the receive input in each state. A control circuit is provided that toggles the select circuit between the first and second states until a link detect signal indicates reception of communication signals. The control circuit holds the select circuit in the particular state in which valid communication signals were detected. In this manner, a communication link is established regardless of the particular crossover connections or functions.

If the link detect signal is subsequently negated thereby indicating subsequent loss of valid communication signals, the control circuit preferably returns to the toggle mode to detect another device coupled to the port. Thus, communication links are established and reestablished without trial and simply by connecting the cable interfaces together.

A physical layer device within an external data device, such as a DTE device, continually transmits communication signals, such as link or data pulses. However, the DTE device may include an internal crossover connection, or a crossover cable may be used for the communication link, so that the transmitted signals may be transmitted to either the first or the second contact sets of the port connector. Or, the external device may be a repeater or switch and the cable may or may not be implemented with a crossover connection. The toggling function of a media detection system according to the present invention periodically and continuously toggles the receive inputs of the local physical layer device between the contact sets of the connector so that the communication signals are eventually detected. Upon detection, the state of the select logic is held or latched to establish a valid communication link.

A clock circuit is provided for generating a periodic sample signal for determining the frequency of the toggling function. The frequency of the toggling function depends upon the particular protocol and the definition of the communication signals to be detected. For example, the communication signals for Ethernet protocols are link pulses, which pulses are each transmitted within approximately 24 milliseconds (ms) of each other. An Ethernet PHY device determines a valid link sequence after between 3 and 11 consecutive pulses are received. Typically, a valid link sequence is obtained after 5–7 consecutive pulses. Thus, the sample signal preferably has a frequency of approximately 2–4 hertz (Hz) to ensure detection of a valid link pulse sequence.

The present invention also contemplates protocols with bidirectional signal pairs, such as Ethernet 100Base-T4. In that case, the port connector further includes third and fourth sets of contacts and the physical layer device further includes first and second bidirectional signal pairs, where the select circuit couples the first and second bidirectional signal pairs of the physical layer device to the third and fourth contact sets, respectively, of said port connector in the first state and crosses the connection in the second state. Of course, any number of contacts and signals may be switched between straight-through and crossover connections as desired.

A media detection system according to the present invention is particularly useful for a multiport device, such as a repeater or switch. Each port includes a corresponding port connector, select logic and physical layer device. Each physical layer device provides a corresponding link detect signal to the control logic, which controls the select logic for each port. Preferably, the control logic provides a plurality of crossover signals, one for the select logic of each port to control the state of each port.

The select logic is illustrated herein as an analog switch with a plurality of switchable contacts. However, the present invention is not limited to any particular implementation and contemplates integrated solutions. The switch logic preferably includes several 2:1 multiplex switches for selectively coupling the transmit and receive signals of the physical layer device to the appropriate contacts of the port connector for performing a straight-through connection in one state and a crossover connection in another state. For protocols using complementary signals pairs, such as Ethernet or Token Ring embodiments using twisted-pair wire physical media, each signal pair of the physical layer device is switched between two different contact pairs of the port connector corresponding to the transmit and receive pairs of a compatible external device.

The control circuit may be implemented in any desired manner for monitoring the link detect signals and providing a corresponding crossover select signal. In one embodiment, the control circuit is a state machine including at least one D-type flip-flop or latch with an enable input for implementing a hold function. The D input receives a periodic sample signal and the Q output provides the crossover select signal to control the select logic. The reference clock for the network device typically has a frequency in the megahertz (MHz) range is convenient for clocking the D flip-flop. For example, the reference clock for Ethernet 10Base-T is 20 MHz and for Ethernet 100Base-TX is 25 MHz. A link detect signal is provided to the enable input (typically inverted) of the D flip-flop to hold the Q output in a steady state upon detection of valid communication signals by the physical layer device. For purposes of synchronization, two more D-type flip-flops may be provided at the front end of the enable or output flip-flop for receiving the link detect signal and for providing a hold signal to the enable input of the output flip-flop.

A method according to the present invention of detecting the connection of an external device to the port connector of a network device comprises the steps of periodically toggling select logic between first and second states to switch the connection of the first and second contact sets of the port connector between the receive input and the transmit output of the physical layer device, monitoring for communication signals in each of the first and second states of the select logic until valid communication signals are detected, and holding the select logic in one of the first and second states in which a link detect signal indicates detection of valid communication signals.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
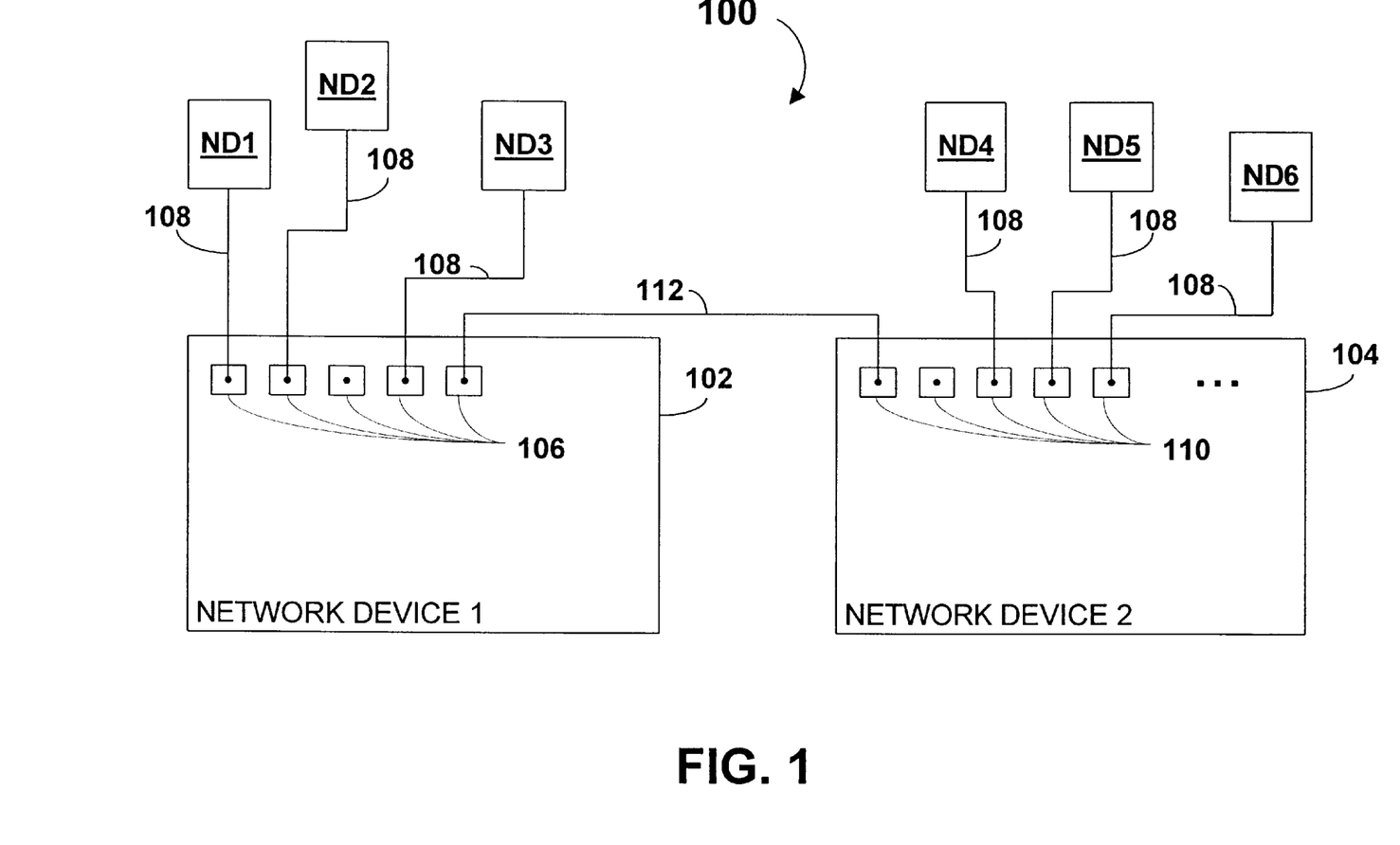
FIG. 1 is a block diagram of a network including network devices implemented according to the present invention.

Referring now to FIG. 1, a block diagram is shown of a network 100 including network devices 102 and 104 implemented according to the present invention. Each of the network devices 102 and 104 is preferably a multiport device, such as a repeater or switch or the like, which enables expansion of the network 100 by connecting as many network devices as there are available ports. For simplicity, the network device 102 is a repeater including a plurality of ports 106. Each of the ports 106 operates according to any one or more of several known protocols, such as 10Base-T, 100Base-TX, 100Base-T4, 100Base-FX, Token Ring UTP/STP, CuDDI UTP5, ATM155 UTP5, ATM25 UTP, FDDI, CDDI, etc. Each of the ports 106 includes the appropriate medium dependent interface (MDI) connector for interfacing the appropriate physical medium.

Although a single device is usually designed for one particular protocol, a combination of protocols is also contemplated. For example, the ports 106 may include a first set of ports operating according to the 10Base-T protocol and a second set of ports operating according to the 100Base-TX protocol. Alternatively, each of the ports 106 may be 10/100 switchable ports for operating at either 10 Mbps or 100 Mbps depending upon the speed of the connected network device. For purposes of simplicity and explanation, the ports 106 are Ethernet 100Base-TX ports. Although the present invention will be described with reference to a conductive wire version using twisted-wire pairs, it is understood that the present invention is equally applicable to other media including optical media or any other known media known or newly discovered.

Several 100Base-TX network devices ND1, ND2 and ND3 are connected to respective ports 106 of the repeater 102 via cable segments 108. Each of the ports 106 and the cable segments 108 include compatible connector pairs for proper electrical connection. The network devices ND1, ND2 and ND3 are preferably DTE devices, such as computer systems with NICs that operate according to the Ethernet 100Base-TX. In this manner, the devices ND1–3 communicate with each other by sending Ethernet packets to and receiving packets from the repeater 102 via a cable segment 108. The repeater 102 generally operates by receiving a packet at one port and transmitting a copy of the received packet to each of the remaining ports 106. Each packet typically includes a source address and a destination address, where each address identifies one of the network devices ND1, ND2 or ND3, although broadcast and multicast packets are also contemplated. A switch operates in a similar manner, but further examines and stores the source and destination addresses and ultimately sends each received packet only to the port of the destination device(s) to reduce network traffic and increase efficiency.

The network device 104 is also a 100Base-TX repeater with a plurality of ports 110 and is implemented in a similar manner as the network device 102. Several 100Base-TX network devices ND4, ND5 and ND6 are connected to respective ports 110 of the network device 104 via similar cable segments 108 in a similar manner as for the network device 102. The network devices ND4–6 are also DTE devices and communicate with each other by sending and receiving Ethernet packets via the cable segments 108. Furthermore, the network devices 102 and 104 are connected to each other via a cable segment 112 connected between any one of the ports 106 and any one of the ports 110. This enables the network devices ND1–3 to communicate with the network devices ND4–6.

Each of the ports 106, 110 and each of the network devices ND1–6 include a PHY device for transmitting and receiving encoded signals via the physical medium, such as the cable segments 108, 112. If implemented according to the recommendations of the IEEE Standards, each PHY device of each ports 106, 110 would include a crossover function and the PHY devices within each of the network devices ND1–6 would not include the crossover function. Thus, the cable segments 108 to establish the connection would be straight-through cables. Of course, if any of the network devices ND1–6 also performed the crossover function, then a crossover cable would be necessary to enable communication. The cable segment 112 would have to be a crossover cable to counterbalance one of the internal crossover functions of the ports 106 and 110. Alternatively, one or more of the ports 106, 108 could include two separate connectors or a single connector with a mechanical switch to selectively perform the crossover function.

The network devices 102 and 104, however, are implemented according to the present invention. Therefore, it does not matter whether any of the network devices ND1–6 or the cable segments 108, 112 perform the crossover function. In particular, each of the ports 106 and 108 automatically detects connection to an external network device and accordingly determines the appropriate crossover function. Of course, not all of the ports 106, 108 need be implemented with automatic detection according to the present invention, so that any number of the ports may be implemented in a standard manner. Any combination is possible and is considered simply a matter of design choice.

Figure 2:
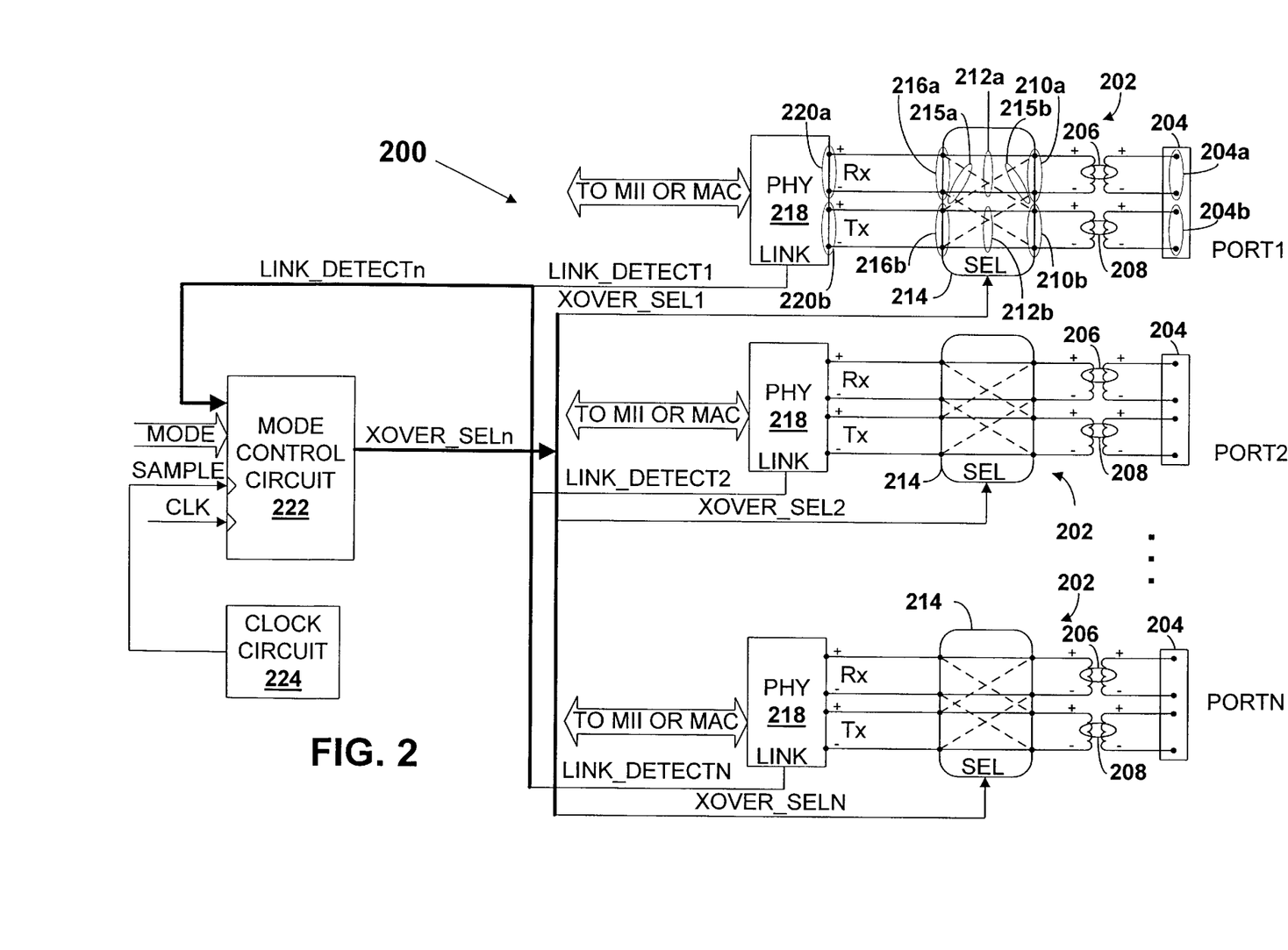
FIG. 2 is a schematic diagram of an automatic media detection circuit implemented according to one embodiment of the present invention.

Referring now to FIG. 2, a schematic diagram is shown of an automatic media detection circuit 200 implemented according to one embodiment of the present invention. In this case, the copper twisted-wire pair version is illustrated. The automatic media detection circuit 200 may be used to implement any one or more of the ports 106, 110 of FIG. 1. The detection circuit 200 includes a plurality of similar ports 202, each of which includes a connector 204 for coupling with a compatible connector of a corresponding cable segment (not shown). For example, the connector 204 is an RJ-45 plug for an Ethernet twisted-pair embodiment. In the embodiment shown, each connector 204 includes at least two pairs of contacts 204a, 204b for interfacing positive and negative transmit signals and positive and negative receive signals, respectively. The ports 202 are individually labeled PORT1, PORT2, . . . PORTN, where "N" is any desired integer for any number of ports 202. Only the first port PORT1 is described, where it is understood that the remaining ports 202 are configured in a similar manner.

It is noted that the present invention is illustrated with several protocols using complementary signal pairs including positive and negative counterpart signals for both transmit and receive functions. Such signal pairs are known for implementing Manchester or Differential Manchester encoding schemes depending upon the particular protocol and physical media. However, the present invention contemplates any type of transmission scheme for implementing the transmit and receive functions. Furthermore, the present invention contemplates wireless transmission schemes and is not limited to protocols using physical media.

The positive and negative contacts of the contact pair 204a are electrically coupled to the positive and negative terminals, respectively, of a secondary port of a bidirectional isolation transformer 206, which includes a primary port with corresponding positive and negative terminals. Likewise, the positive and negative contacts of the contact pair 204b are electrically coupled to the positive and negative terminals, respectively, of a secondary port of another bidirectional isolation transformer 208, which includes a primary port with corresponding positive and negative terminals. It is noted that the isolation transformers 206 and 208 transfer encoded signals in either direction so that either port may be considered primary or secondary. The positive and negative terminals of the primary port of the transformer 206 are connected to respective contacts of a pair of contacts 210a of select logic 214, and the positive and negative terminals of the primary port of the transformer 208 are connected to respective contacts of a pair of contacts 210 of the select logic 214.

A transceiver PHY device 218 is provided which includes a positive and negative pair of receive (RX) contacts 220a and a positive and negative pair of transmit (TX) contacts 220b. The respective contacts of the RX contact pair 220a are coupled to respective contacts of a pair of contacts 216a of the select logic 214. The respective contacts of the TX contact pair 220b are coupled to respective contacts of a pair of contacts 216b of the select logic 214. The select logic 214 includes a select input SEL, which receives a respective binary crossover signal XOVER_SEL1 for determining whether a crossover function is performed. Each of the ports 202 receives an XOVER_SELx signal, where the suffix "x" is an integer corresponding to the port number "N". For example, the XOVER_SEL1 signal corresponds to the port PORT1, a signal XOVER_SEL2 corresponds to the port PORT2, and so on, where all of the crossover signals are collectively referred to as the XOVER_SELn signals.

If the XOVER_SEL1 signal is negated low, then the select logic 214 internally connects respective contacts of the contact pair 216a to respective contacts of the contact pair 210a, as illustrated by a pair of internal connection lines 212a. In this manner, the positive RX contact of the RX contact pair 220a of the PHY device 218 is electrically coupled to the positive terminal of the primary port of the transformer 206 and the negative RX contact of the RX contact pair 220a is electrically coupled to the negative terminal of the primary port of the transformer 206. Also, when the XOVER_SEL1 signal is negated low, then the select logic 214 internally connects respective contacts of the contact pair 216b to respective contacts of the contact pair 210b, as illustrated by a pair of connection lines 212b. In this manner, the positive TX contact of the TX contact pair 220b of the PHY device 218 is electrically coupled to the positive terminal of the primary port of the transformer 208 and the negative TX contact of the TX contact pair 220b is electrically coupled to the negative terminal of the primary port of the transformer 208.

If, however, the XOVER_SEL1 signal is asserted high, then the select logic 214 internally connects the respective contacts of the contact pair 216a to the respective contacts of the contact pair 210b, as illustrated by a pair of dashed-line connection lines 215a. In this manner, the positive RX contact of the RX contact pair 220a of the PHY device 218 is electrically coupled to the positive terminal of the primary port of the transformer 208 and the negative RX contact of the RX contact pair 220a is electrically coupled to the negative terminal of the primary port of the transformer 208. Also, when the XOVER_SEL1 signal is asserted high, then the select logic 214 internally connects the respective contacts of the contact pair 216b to the respective contacts of the contact pair 210a, as illustrated by a pair of dashed-line connection lines 215b. In this manner, the positive TX contact of the TX contact pair 220b of the PHY device 218 is electrically coupled to the positive terminal of the primary port of the transformer 206 and the negative TX contact of the TX contact pair 220b is electrically coupled to the negative terminal of the primary port of the transformer 206.

The PHY device 218 is implemented according to any of the known network protocols, such as Token Ring, Ethernet, FDDI, CDDI, ATM, etc. For Ethernet, such as 10Base-T or 100Base-TX, the RX contact pair 220a includes signals RxD2+ and RxD2− and the TX contact pair 220b includes the signals TxD1+ and TxD1−. Ethernet 100Base-T4 includes the RxD2+/− and TxD1+/− signal pairs, but also includes bidirectional signal pairs BiD3+, BiD3− and BiD4+, BiD4− which signal pairs are also crossed in the crossover connection as described below with reference to FIG. 3. For Token Ring and CuDDI or CDDI, the RX contact pair 220a includes signals Rx+ and Rx− and the TX contact pair 220b includes the signals Tx+ and Tx−. For ATM, the RX contact pair 220a includes signals RxA and RxB and the TX contact pair 220b includes the signals TxA and TxB. Each PHY device 218 is coupled to an appropriate and corresponding media-access control (MAC) device (not shown) for implementing the MAC data link sub-layer.

The particular configuration and pin assignments of the contacts between straight and crossover connections of each of the connectors 204 depends upon the particular protocol involved. The following tables 1–5 provide the pin assignments for the indicated protocols as referenced from a hub, repeater or switch:

TABLE 1

Connector 204 Pin Assignments for Ethernet 10Base-T and 100Base-TX

| Pin # | Signal Name | Signal Polarity | Crossover Configuration |
|---|---|---|---|
| 1 | RxD2 | + | 1 → 6 |
| 2 | RxD2 | − | 2 → 3 |
| 3 | TxD1 | − | 3 → 2 |
| 6 | TxD1 | + | 6 → 1 |

TABLE 2

Connector 204 Pin Assignments for Token Ring UTP

| Pin # | Signal Name | Signal Polarity | Crossover Configuration |
|---|---|---|---|
| 3 | Rx | − | 3 → 5 |
| 4 | Tx | + | 4 → 6 |
| 5 | Tx | − | 5 → 3 |
| 6 | Tx | + | 6 → 4 |

TABLE 3

Connector 204 Pin Assignments for Token Ring STP

| Pin # | Signal Name | Signal Polarity | Crossover Configuration |
|---|---|---|---|
| 1 | Tx | + | 1 → 9 |
| 5 | Rx | − | 5 → 6 |
| 6 | Tx | − | 6 → 5 |
| 9 | Rx | + | 9 → 1 |

TABLE 4

Connector 204 Pin Assignments for CuDD1 UTP5

| Pin # | Signal Name | Signal Polarity | Crossover Configuration |
|---|---|---|---|
| 1 | Tx | + | 1 → 7 |
| 2 | Tx | − | 2 → 8 |
| 7 | Rx | + | 7 → 1 |
| 8 | Rx | − | 8 → 2 |

TABLE 5

Connector 204 Pin Assignments for ATM115 UTP5 and ATM25 UTP

| Pin # | Signal Name | Signal Polarity | Crossover Configuration |
|---|---|---|---|
| 1 | RxA | na/ | 1 → 7 |
| 2 | RxB | n/a | 2 → 8 |

TABLE 5-continued

Connector 204 Pin Assignments for ATM115 UTP5 and ATM25 UTP

| Pin # | Signal Name | Signal Polarity | Crossover Configuration |
|---|---|---|---|
| 7 | TxA | n/a | 7 → 1 |
| 8 | TxB | n/a | 8 → 2 |

It is noted that the initial pin number assignments represented by the first two columns in each of the Tables 1–5 represents an internal crossover function as recommended by the IEEE 802 Standards, and that the crossover configuration in the last column represents a "straight-through" connection. For example, for the Ethernet protocol in Table 1, the pin assignments RxD2+=pin #1, RxD2−=pin #2, TxD1−=pin #3 and TxD1+=pin #6 represents an internal crossover function, whereas the pin assignments for the "crossover" configuration RxD2+=pin #6, RxD2−=pin #3, TxD1−=pin #2 and TxD1+=pin #1 represents a "non-crossover" function. It is noted, however, that for purposes of the present invention, the distinction between crossover and non-crossover connections is arbitrary since the automatic media detection circuit 200 establishes a working communication in either case.

According to clause 14.2.1.1 of the IEEE 802.3 Standard, a 10Base-T compliant device sends compliant link integrity test pulses, or the Normal Link Pulse (NLP) sequence when connected. A device capable of 100 Mbps sends a Fast Link Pulse (FLP) burst, which is a series of link integrity test pulses that form an alternating clock/data sequence. These sequences may be used to implement the Auto-Negotiation function as defined in clause 28 of the IEEE 802.3u Standard. For Ethernet, each link pulse has a duration between 75 and 120 nanoseconds (ns) and the duration between each link pulse is between 8 and 24 milliseconds (ms). Similar link pulse sequences may be defined for other protocols. However, in some protocols, such as the ATM protocols, a connected device begins sending data signals upon connection. In general, a connected device sends communication signals until detected by a receiving device, which respondingly transmits corresponding communication signals to establish a communication link.

The PHY device 218 continually monitors the signals of its RX contact pair 220a to detect communication signals being transmitted by an external device. For example, an Ethernet PHY device detects a valid link pulse sequence by counting at least 3 link pulses and up to 11 pulses by a compatible external device before determining a valid link pulse sequence, which requires at least approximately 70–80 ms. Typically, 5–7 pulses are needed. If communication signals are detected, then the PHY device 218 asserts a corresponding LINK_DETECT1 signal high indicating detection of a compliant device. If the communication signals are not detected, the PHY device 218 negates its LINK_DETECT1 signal low. Again, each of the ports 202 includes a PHY device 218 which asserts a corresponding LINK_DETECTx signal, where "x" is an integer corresponding to the port number "N". For example, the LINK_DETECT1 signal corresponds to the port PORT1, a signal LINK_DETECT2 corresponds to the port PORT2, and so on, where all of the link detect signals are collectively referred to as the LINK_DETECTn signals.

A mode control circuit 222 receives all of the LINK_DETECTn signals, a sample clock signal SAMPLE, a LAN reference clock signal CLK and a mode select signal MODE, and controls the XOVER_SELn signals. A clock circuit 224 generates the SAMPLE signal for the mode control circuit 222. The mode control circuit 222 generally operates to continuously toggle each of the XOVER_SELn signals between logic zero (0) and logic one (1) until corresponding ones of the LINK_DETECTn signals are asserted, at which time the corresponding XOVER_SELn signals are latched. It is noted that the toggle frequency, which is derived from the frequency of the SAMPLE signal, should be low enough to ensure that each PHY device 218 has sufficient time to detect valid communication signals (such as a valid link pulse sequence or valid data signals) and assert its corresponding LINK_DETECTx signal. The SAMPLE clock signal may be derived from the CLK signal, but is preferably generated independently due to the large difference between the respective frequencies. For Ethernet, the CLK signal is 20 megahertz (MHz) for 10 Mbps embodiments and 25 MHz for 100 Mbps embodiments. A minimum of 70–80 ms is needed to assure link detection of 3 consecutive link pulses, which corresponds to a frequency of approximately 7 hertz (Hz) for the SAMPLE clock signal. For Ethernet, a good choice is approximately 3 Hz to include at least 6 consecutive link pulses. Of course, the frequency of the SAMPLE signal will be different depending upon the protocol and the communication signals to be detected.

When any LINK_DETECTx signal is asserted, the mode control circuit 222 latches the corresponding XOVER_SELx signal, and disables the toggling function of the XOVER_SELx signal for the port. If the LINK_DETECTx signal is subsequently negated, the mode control circuit 222 returns the XOVER_SELx signal to the toggle mode. In this manner, for each PHY device 218, the mode select circuit 220 continuously toggles the XOVER_SELx signal to toggle connection of the RX contact pair 220a between the contact pair 210a and the contact pair 210b until the corresponding LINK_DETECTx is asserted. When the LINK_DETECTx is asserted, the mode select circuit 220 latches the XOVER_SELx signal to keep it in the same state in which the LINK_DETECTx was asserted.

For example, suppose a network device (not shown) is connected through an appropriate cable and connector to the connector 204 of PORT1 of the automatic media detection circuit 200. The TX signal pair of the PHY device (not shown) of the connected network device may be connected to the corresponding contacts of either the isolation transformer 206 or the isolation transformer 208, when the RX signal pair is connected to the opposite isolation transformer. The PHY device of the external network device continuously sends communication signals on its TX signal pair, which, for purposes of illustration, will assume to be connected to the contact pair 204a of the connector 204, and thus to the secondary terminals of the isolation transformer 206. Eventually, the mode control circuit 222 negates the XOVER_SEL1 signal, so that the contact pair 216a of the select logic 214 is connected to the contact pair 210a. The communications signals asserted by the network device is thus transmitted to the RX contact pair 220a of the PHY device 218, which detects the communication signals and asserts the LINK_DETECT1 signal. The mode control circuit 222 detects assertion of the LINK_DETECT1 signal and respondingly latches the XOVER_SEL1 signal in a low logic state. If the LINK_DETECT1 signal is subsequently negated, such as, for example, if the external network device coupled through PORT1 is subsequently disconnected, the mode control circuit 222 again toggles the XOVER_SEL1 signal to repeat the procedure.

On the other hand, if the TX signal pair of the network device is connected to the contact pair 204b of the connector 204, then the communication link is established when the XOVER_SEL1 signal is asserted high. In this manner, an operable communication link is established regardless of whether the connected network device includes a crossover function or not and regardless of whether a crossover cable is used or not. The circuitry of each of the remaining ports PORT2, PORT3, . . . , PORTN operates in a similar manner as PORT1.

An automatic media detection circuit according to the present invention is implemented in any desired fashion, such as a discrete embodiment using analog and digital discrete components, or an integrated solution such as one or more integrated circuits (ICs), application specific integrated circuits (ASICs), or the like. In a discrete embodiment, the select logic 214 performs a multiplex (mux) function, which is implemented with any type of select logic, multiplex logic, analog switch, relay or switching device known to those skilled in the art. For example, the QS3390 "Quick Switch" manufactured by Quality Semiconductor is a good choice as an analog switch because of several beneficial features, including nearly 0 ns of propagation delay, very low static resistance, relatively low pin capacitance for both control and channel pins, very high current drive capability per channel, relatively linear transfer function of $V_{OUT}$ versus $V_{IN}$ for up to four (4) volts direct current ($V_{DC}$), and deterministic dynamic properties. The QS3390 includes eight 2:1 muxes, where each contact of the PHY device 218 is connected to one "input" contact of the select logic 214, which input contact is selectively coupled to one of two different "output" contacts of the of the select logic 214 based on its select input, thereby performing the crossover function. For the mode control circuit 222 including two pairs per port, only four 2:1 muxes are needed per port.

Figure 3:
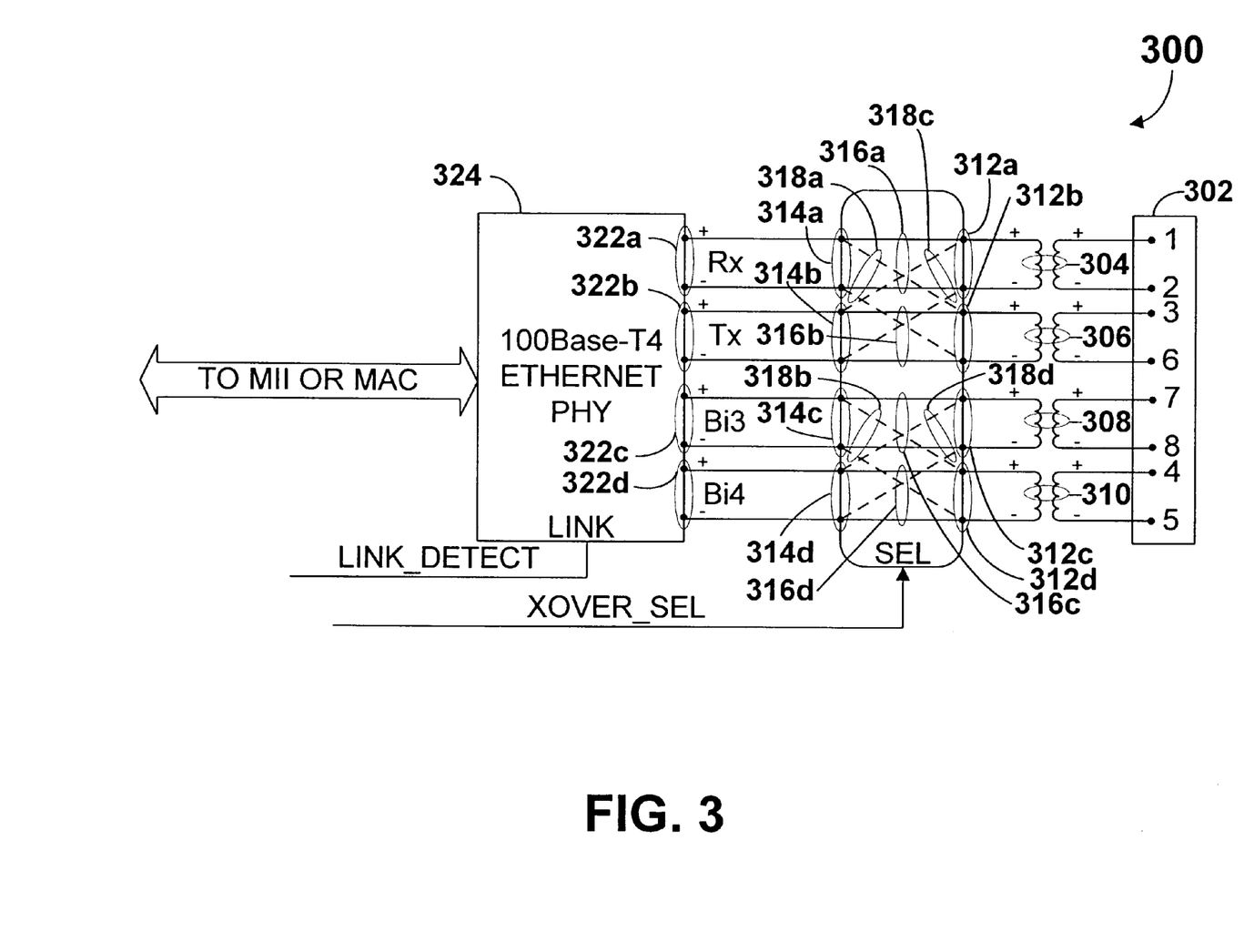
FIG. 3 is a schematic diagram of a port circuit to replace the port circuit of FIG. 2 for an Ethernet 100Base-T4 configuration.

FIG. 3 is a schematic diagram of a port circuit 300 for implementing each port of an Ethernet 100Bast-T4 configuration, where the port circuit 300 replaces the comparable port circuitry of each of the ports 202 of the automatic media detection circuit 200. In particular, the PHY device 218, the select logic 214, the isolation transformers 206, 208 and the connector 204 are replaced with an Ethernet 100Base-T4 PHY device 324, an select logic 320, isolation transformers 304, 306, 308 and 310, and a connector 302, respectively, for each of the ports 202. Connectivity and operation is similar, except that the port circuit 300 includes the crossover function for the signal pairs BiD3+/− and BiD4+/− of the 100Base-T4 protocol.

The positive and negative terminals of the secondary port of the isolation transformers 304, 306, 308 and 310 are connected to pins 1 and 2, pins 3 and 6, pins 7 and 8 and pins 4 and 5, respectively, of the connector 302. The positive and negative terminals of the primary port of the isolation transformers 304, 306, 308 and 310 are connected to first and second contacts of contact pairs 312a, 312b, 312c and 312d, respectively, of the select logic 320. The RxD2+/−, TxD1+/−, BiD3+/− and BiD4+/− signals of signal pairs 322a–d of the PHY device 324 are connected to first and second contacts of contact pairs 314a, 314b, 314c and 314d, respectively, of the select logic 320. The select logic 320 includes a select input SEL for receiving a crossover select signal XOVER_SEL. When the XOVER_SEL signal is negated low, the select logic 320 connects the first and second contacts of the contact pairs 314a–d to the first and second contacts of the contact pairs 312a–d, respectively, as illustrated by respective internal connection pairs 316a–d. When the XOVER_SEL signal is asserted high, the select logic 320 connects the first and second contacts of the contact pairs 314a–d to the first and second contacts of the contact pairs 312*b*, 312*a*, 312*d* and 312*c*, respectively, as illustrated by respective internal dashed-line connection pairs 318*a–d*. It is noted that the connection pairs 316*a–d* represent an internal crossover connection and that the connection pairs 318*a–d* represent non-crossover connections as previously described. However, a system according to the present invention alleviates any need for such nomenclature.

The following table 6 provides the pin assignments for the Ethernet 100Base-T4 protocol as referenced from a hub, repeater or switch:

TABLE 6

Connector 204 Pin Assignments for Ethernet 100Base-T4

| Pin # | Signal Name | Signal Polarity | Crossover Configuration |
|---|---|---|---|
| 1 | RxD2 | + | 1 ⇒ 3 |
| 2 | RxD2 | − | 2 ⇒ 6 |
| 3 | TxD1 | + | 3 ⇒ 1 |
| 4 | BiD4 | + | 4 ⇒ 7 |
| 5 | BiD4 | − | 5 ⇒ 8 |
| 6 | TxD1 | − | 6 ⇒ 2 |
| 7 | BiD3 | + | 7 ⇒ 4 |
| 8 | BiD3 | − | 8 ⇒ 6 |

The QS3390 Quick Switch may also be used to implement the select logic 320 in a discrete design, where all eight 2:1 internal muxes are used to complete the straight-through and crossover connections.

Figure 4:
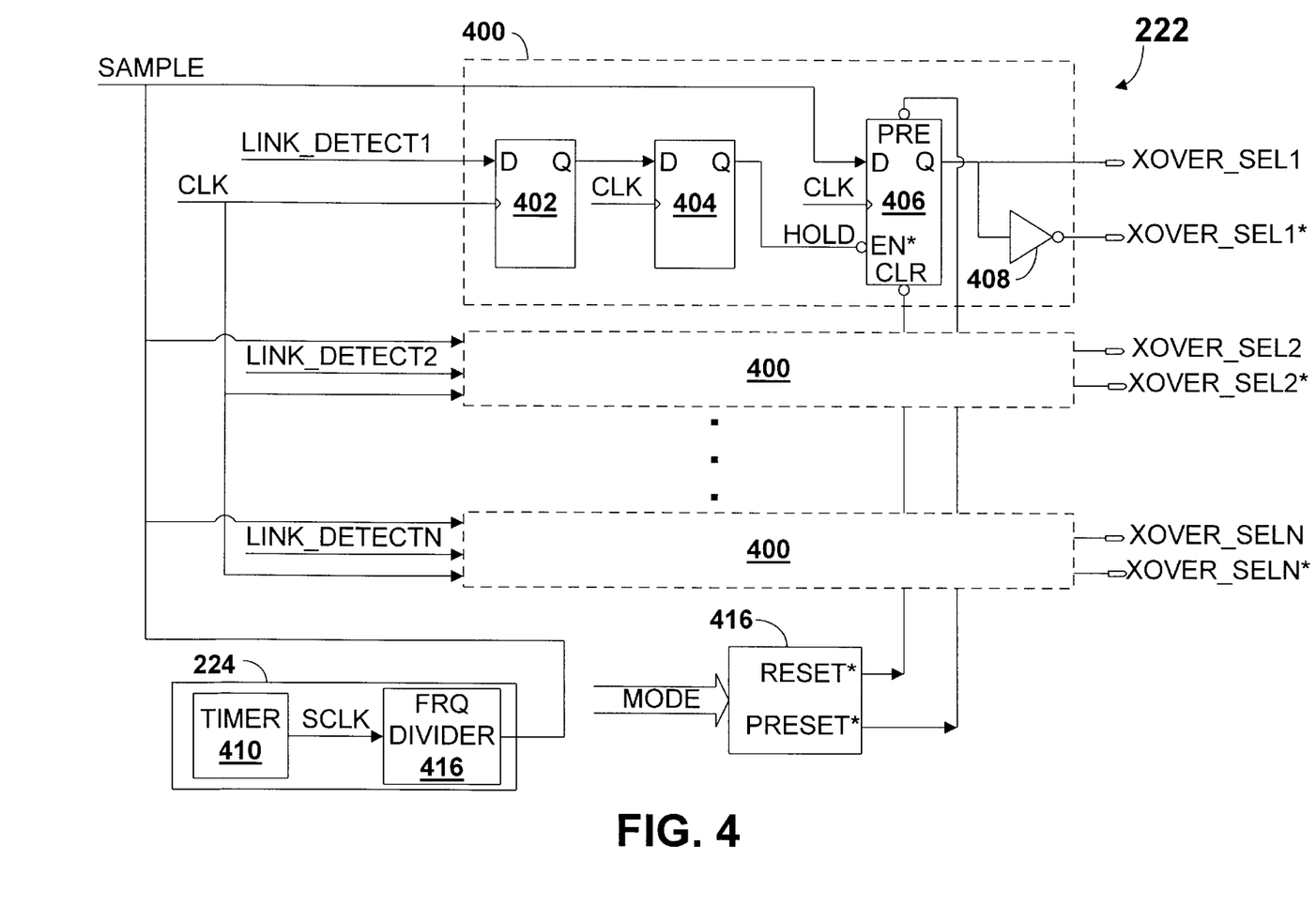
FIG. 4 is a schematic diagram of a discrete embodiment of the mode control circuit of FIG. 2.

Referring now to FIG. 4, a schematic diagram is shown of a discrete embodiment of the mode control circuit 222. A logic state machine 400 is provided for each of the ports PORT1, PORT2, PORT3, . . . , PORTN, where each state machine 400 receives the CLK and SAMPLE clock signals and a corresponding LINK_DETECTx signal, and asserts a corresponding XOVER_SELx signal as previously described. Thus, port PORT1 receives the LINK_DETECT1 signal and asserts the XOVER_SEL1 signal, PORT2 receives the LINK_DETECT2 signal and asserts the XOVER_SEL2 signal, and so on. Each of the ports PORT1-N also asserts a logic negation signal of each of the XOVER_SELn signals, which are referred to as the XOVER_SELn* signals, where an asterisk (*) appended to a signal name denotes negative logic. Thus, PORT1 asserts a signal XOVER_SEL1*, PORT2 asserts a signal XOVER_SEL2*, and so on.

Each of the state machines 400 for each of the ports PORT1-N are implemented in a similar manner, so that only the logic for PORT1 is shown and described. The LINK_DETECT1 signal is provided to the data (D) input of a D-type flip-flop (DFF) 402, which has a Q output coupled to the D input of another DFF 404. The DFFs 402 and 404 are any standard D-type flip-flops, such as an SN7474 dual, positive edge-triggered D-type flip-flop manufactured by Texas Instruments, Inc. (TI). The Q output of the DFF 404 asserts a signal HOLD, which is provided to the inverted enable input of a third DFF 406. The DFF 406 is also a D-type flip-flop, but preferably includes an inverted enable input, such as an SN74LS377 D-type, low-power Schottky flip-flop manufactured by TI.

The DFF 406 asserts the XOVER_SEL1 signal at its Q output. An inverter 408 receives the XOVER_SEL1 signal at its input and asserts the XOVER_SEL1* signal at its output. Each of the DFFs 402, 404 and 406 have clock inputs receiving the CLK signal. The SAMPLE signal is provided to the D input of the DFF 406. It is noted that the same SAMPLE signal is provided to each DFF corresponding to the DFF 406 within all of the ports PORT1-N to assure that all of the muxes of the select logic 214, 320 are in the same phase when all of the LINK_DETECTn signals are negated. This substantially eliminates the possibility of creating closed loop segments in a homogeneous stack unit or chassis hub. The clock circuit 224 generates the SAMPLE clock signal for each of the ports PORT1-N. The clock circuit 224 includes a timer circuit 410, which generates a clock signal SCLK for deriving the SAMPLE clock signal. The SCLK signal is provided to the clock input of a frequency divider circuit 412, which provides the SAMPLE signal at its output. In one embodiment, the timer circuit 410 includes a 555-type timer or the like for generating the SCLK signal, and the frequency divider circuit 412 divides the SCLK signal by 16 to develop the SAMPLE clock signal. As described previously, the SAMPLE clock signal is preferably approximately 3–4 Hz. It is noted, however, that the clock circuit 224 may be implemented in any desired manner to provide an appropriate sample clock signal.

A mode circuit 416 is optionally included, which receives mode signals, collectively referred to as the MODE signals, and asserts preset (PRESET*) and clear or reset (RESET*) signals. The PRESET* signal is provided to the preset (PRE) input and the RESET* signal is provided to the clear (CLR) input of the DFF 406 within each of the state machines 400. The MODE signals are provided to selectively assert or negate the PRESET* and RESET* signals. In this manner, all of the ports PORT1-N may be placed in the same state during power up or reset, or may be individually controlled as desired.

In operation, the DFF 406 toggles the XOVER_SEL1 signal to follow the SAMPLE signal while the LINK_DETECT1 and the HOLD signals are low. When the LINK_DETECT1 signal is asserted high by the PHY device 218, the DFF 402 asserts its Q output high on the next rising edge of the CLK signal, and the DFF 404 correspondingly asserts the HOLD signal high on the following rising edge of the CLK signal. Assertion of the HOLD signal causes the DFF 406 to stop toggling and to latch its Q output upon assertion of the HOLD signal. The XOVER_SEL1 and XOVER_SEL1* signals thus remain at a steady logic state while the LINK_DETECT1 signal is asserted. In this manner, when the PHY device 218 detects valid communication signals, the state machine 400 latches the current state of the XOVER_SEL1 signal to maintain the communication link.

If the PHY device 218 subsequently loses the communication signals, it negates the LINK_DETECT1 signal. The DFFs 402, 404 subsequently negate their Q outputs upon successive cycles of the CLK signal, thereby negating the HOLD signal low. The DFF 406 respondingly returns to the toggle mode by continuously toggling the XOVER_SEL1 and XOVER_SEL1* signals as previously described, until the LINK_DETECT1 signal is next asserted. Operation of the remaining ports PORT2-N is similar. The inclusion of the DFFs 402, 404 provide synchronization and reduces susceptibility to glitches of the LINK_DETECTn signals.

In an integrated version, the mux or crossover function represented by the select logic 214 is implemented digitally within an automatic media sense PHY device 218, which has dual purpose input/output (I/O) pins that change from TX outputs to RX inputs. The I/O switching is controlled by one system master state machine engine, so that all of the ports or nodes in the homogenous unit use the same master clock. Alternatively, separate and dedicated input and output pins are attached to each other externally and controlled in a similar manner as a discrete version. Although not shown, impedance matching termination resistors are provided for each source transmitter and receiver input signal pair. The resistors are preferably the same for both TX and RX to simplify the front end circuitry and the implementation of the auto media sense detect circuit.

The PHY device 218 is either a 10 Mbps, a 100 Mbps or a 10/100 Mbps device and includes status registers (not shown) to provide indications for 10 Mbps link, 100 Mbps link and Auto Negotiation Sequence Status. These status registers are used to control the select pin of the muxes to provide infinite control over MDI or MDI-X timing and static positioning. For example, an external master timer may be eliminated by using a software driver to query the internal status registers for status information, such as the link condition of each port and/or the status of each Auto Negotiation State Machine (including whether the PHY is negotiating a link in 10 Mbps mode, 100 Mbps mode, full or half duplex, etc.). After a PHY has exhausted its link detect state machine process, a status register may be used to indicate termination of the process, where the software driver then changes the state of the select pin of the mux.

It is now appreciated that an automatic media detection circuit according to the present invention automatically detects the connection of a compatible network device through cable media at a port and establishes a working communication link. Control logic continuously toggles select logic at each port between straight through and crossover connections until communication signals are detected. The control logic then latches the state of the port while the link remains valid, thereby enabling communication. In this manner, there is no need to determine an appropriate cable type for a given network device and there is no need to independently label the ports, since the crossover function is automatically negotiated.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A media detection system for a network device, comprising:

at least one port connector including first and second contact sets;

at least one physical layer device including a transmit output and a receive input that monitors said receive input for communication signals and provides a link detect signal indicative thereof;

at least one select circuit coupled to said at least one port connector and said at least one physical layer device that couples said receive input of said physical layer device to said first contact set of said port connector in a first state and that couples said receive input of said physical layer device to said second contact set of said port connector in a second state; and a control circuit coupled to said at least one select circuit and receiving said link detect signal that provides a crossover signal to toggle said select circuit between said first and second states until said link detect signal indicates reception of communication signals, said control circuit comprising:

a first flip-flop having a data input that receives said link detect signal and that asserts a latched link detect signal;

a second flip-flop having a data input receiving said latched link detect signal and that provides a latched hold signal; and a third flip-flop that toggles said crossover signal having a data input receiving a periodic sample signal and an enable input receiving said latched hold signal.

2. The media detection system of claim 1, further comprising:

said control circuit holding said select circuit into one of said first and second states while said communication signals are detected; and said control circuit returning to toggling said select circuit between said first and second states if said link signal indicates subsequent loss of said communication signals.

3. The media detection system of claim 1, further comprising:

said at least one port connector comprising a plurality of port connectors, each including first and second contact sets;

said at least one physical layer device comprising a plurality of physical layer devices, each including a transmit output and a receive input where each monitors its respective receive input for communication signals and provides a corresponding link detect signal indicative thereof;

said at least one select circuit comprising a plurality of select circuits, each coupled to a corresponding one of said plurality of port connectors and to a corresponding one of said plurality of physical layer devices, wherein each one of said plurality of select circuits couples a receive input of a corresponding physical layer device to a first contact set of a corresponding port connector in a first state and couples said receive input of said corresponding physical layer device to a second contact set of said corresponding port connector in a second state; and said control circuit being coupled to each of said plurality of select circuits and receiving a plurality of corresponding link detect signals to toggle each of said plurality of select circuits between said first and second states until corresponding link detect signals indicate reception of respective communication signals.

4. The media detection system of claim 3, wherein the network device is a repeater.

5. The media detection system of claim 1, further comprising:

said select circuit comprising an analog switch including a plurality of multiplex switches, each receiving said crossover select signal.

6. The media detection system of claim 1, further comprising:

each of said first and second sets of contacts of said at least one port connector including first and second contacts;

said transmit output and said receive input of said at least one physical layer device each including a pair of complementary signals; and said at least one select circuit selectively coupling said pair of complementary signals of said transmit output and said receive input of said at least one physical layer device between respective contacts of said first and second sets of contacts of said at least one port connector.

7. The media detection system of claim 1, further comprising:

said at least one port connector further including third and fourth sets of contacts;

said at least one physical layer device further including first and second bidirectional signal pairs; and said at least one select circuit further coupling said transmit output, said first bidirectional signal pair and said second bidirectional signal pair of said physical layer device to said second, third and fourth contact sets, respectively, of said port connector in said first state and coupling said transmit output, said first bidirectional signal pair input and said second bidirectional signal pair of said physical layer device to said first, fourth and third contact sets, respectively, of said port connector in said second state.

8. The media detection system of claim 1, further comprising:

a clock circuit that generates said periodic sample signal.

9. The media detection system of claim 8, wherein said clock circuit comprises:

a timer circuit to provide an intermediate clock signal; and a frequency divider that receives said intermediate clock signal and that provides said sample signal.

10. A network system, comprising:

a plurality of network data devices, each capable of sending and receiving data through a network segment; and a multiport network device for coupling to each of said plurality of network data devices to transfer data therebetween, said network device comprising:

a plurality of ports, each including a port connector having first and second contact sets that interface a corresponding network segment;

a plurality of physical layer devices, each including a transmit output and a receive input where each monitors its respective receive input for communication signals from a network data device and that respondingly provides a corresponding link detect signal indicative thereof;

a plurality of select circuits, each coupled to a corresponding one of said plurality of port connectors and to a corresponding one of said plurality of physical layer devices, wherein each one of said plurality of select circuits couples a transmit output and a receive input of a corresponding physical layer device to first and second contact sets, respectively, of a corresponding port connector in a first state and couples a receive input and a transmit output of said corresponding physical layer device to first and second contact sets, respectively, of said corresponding port connector in a second state; and a control circuit coupled to each of said plurality of select circuits that receives a corresponding plurality of link detect signals and that asserts a corresponding plurality of crossover signals to toggle each of said plurality of select circuits between said first and second states until corresponding link detect signals indicate reception of respective communication signals, wherein upon detection of any communication signals, said control circuit holds corresponding ones of said plurality of select circuits into one of said first and second states, said control circuit including a plurality of latch circuits, each comprising:

a first flip-flop having a data input receiving a corresponding one of said plurality of link detect signals for asserting a latched link detect signal;

a second flip-flop having a data input that receives said latched link detect signal and that provides a latched hold signal; and a third flip-flop having a data input that receives a periodic sample signal to toggle a corresponding one of said plurality of crossover signals and an enable input that receives said latched hold signal.

11. The network system of claim 10, wherein said multiport network device is a repeater.

12. The network system of claim 10, wherein each of said plurality of select circuits comprises an analog switch.

13. The network system of claim 10, further comprising:

each of said plurality of select circuits receiving a corresponding one of said plurality of crossover signals from said control circuit to control switching between said first and second states; and a clock circuit that generates a periodic sample signal.

14. The network system of claim 13, further comprising:

said multiport network device generating a network clock signal; and said third flip flop of each of said plurality of latch circuits including a clock input that receives said network clock signal.

15. The network system of claim 10, wherein at least one of said plurality of network data devices is a data terminal equipment device asserting a link pulse sequence.

16. The network system of claim 10, wherein at least one of said plurality of network data devices is a multiport repeater.

\* \* \* \* \*